United States Patent [19]

Katz

[11] Patent Number: 4,838,262
[45] Date of Patent: Jun. 13, 1989

[54] EXHALATION VALVE
[75] Inventor: Richard Katz, Pittsburgh, Pa.
[73] Assignee: Mine Safety Appliances Company, Pittsburgh, Pa.
[21] Appl. No.: 189,329
[22] Filed: May 2, 1988
[51] Int. Cl.⁴ .............................................. A67B 18/02
[52] U.S. Cl. .......................... 128/205.24; 128/207.12; 137/854
[58] Field of Search ...................... 128/201.28, 205.24, 128/205.23, 206.21, 207.12, 207.16; 137/852, 854

[56] References Cited

U.S. PATENT DOCUMENTS

| | | | |
|---|---|---|---|
| 1,867,478 | 7/1932 | Stelzner | 128/207.12 |
| 3,354,903 | 11/1967 | Caruso | 137/854 |
| 3,473,561 | 10/1969 | Svenson et al. | 137/854 |
| 3,799,427 | 3/1974 | Goglio | 137/854 |
| 3,990,439 | 11/1976 | Klinger | 128/207.12 |
| 4,610,246 | 9/1986 | Delphia | 128/205.24 |

Primary Examiner—David A. Wiecking
Assistant Examiner—Kimberly L. Asher
Attorney, Agent, or Firm—Douglas K. McClaine

[57] ABSTRACT

An exhalation valve decreases the exhalation pressure resistance through a valve by causing the moment of inertia of a flapper valve to be reduced along an axis by flattening out the curved edges of the umbrella-shaped flapper valve, thereby enabling greater ease in bending of the flapper valve.

2 Claims, 3 Drawing Sheets

EXHALATION VALVE

FIELD OF THE INVENTION

The invention relates to a low pressure exhalation valve suitable for use on respirators, gas masks and other breathing apparatus.

BACKGROUND OF THE INVENTION

Unidirectional exhalation valves are well known in the art. Generally, exhalation valves are check valves permitting air flow in one direction while preventing air flow in the opposite direction. The incorporation of an exhalation valve into a breathing device is necessary to enable the breathing mask to vent exhaled air from inside of the mask to the outside atmosphere, while preventing atmospheric air from being drawn back into the mask during inhalation.

Many exhalation valves are comprised on three basic parts, a hollow valve body that acts as both a valve seat and channel between the inside and outside of the mask, a flapper or disk valve and a valve cap, having vents or slots to permit air flow between the mask and the outside atmosphere.

An exhalation valve is positioned in the mask so that when the user inhales, the pressure inside of the mask goes negative. The negative pressure causes the flapper valve to be drawn against the valve seat thereby sealing the air passage through the valve body. When the user then exhales, the user's breath causes the pressure inside of the mask to go positive. The positive pressure and exhaled air, unseats the flapper valve, opening the air passage through the valve body and forcing the exhaled air out of the mask. An exhalation valve having a valve seat, flapper valve and valve cap is disclosed in Schneider, U.S. Pat. No. 3,085,591.

Because the pressure inside of the mask is changed only by the user's breathing, the cracking or break-open pressure of the valve must be relatively low yet maintain a proper seal to prevent back leakage. Flapper valves are usually made of resilient flexible materials such as rubber and are normally circular in shape to obtain a better seal on the valve seat. The circular shape of the flapper valve does, however, cause high exhalation resistance pressures. High exhalation resistance pressures can cause the user to become fatigued during the breathing cycle because the user must push harder with the lungs to overcome the resistance.

It is, thus, desirable to have an exhalation valve that seals tightly during inhalation to prevent back leakage into the mask, yet imposes very slight exhalation resistance pressures.

It is one object of this invention to provide an exhalation valve that has low exhalation resistance pressure yet provides excellent sealing characteristics to prevent back leakage.

SUMMARY OF THE INVENTION

The valve of this invention is comprised of three parts; a valve body that acts as a valve seat and air channel, a circular umbrella-shaped flexible flapper valve positioned to permit flow through the valve body during exhalation yet prohibit flow through the channel during inhalation and a valve cap that has slotted vents that permit air flow through the cap. The flapper valve is umbrella-shaped to achieve a better seal on the valve seat during inhalation.

Formed inside of the valve cap is an integral blade divider positioned perpendicular to the slotted surface of the cap. The blade divider extends across the entire inner diameter of the valve cap and is high enough so that when the valve cap is connected to the valve body, the inner edge of the blade is impinged upon and across the flexible flapper valve. When the blade is forced against the umbrella-shaped flapper valve, the corners of the umbrella are deflected, thus eliminating the curved edge of the umbrella at two points 180° apart. The deflection of the corners of the umbrella reduce the movement of inertia along the axis of the flapper valve in contact with the blade. Upon exhalation, the user's breath is forced against the side of the flapper valve that is opposite the side of the flapper valve that contacts the blade. The reduced moment of inertia along the valve axis causes the flapper valve to bend easily along the axis thereby reducing the resistance pressure to the exhalation air flow through the valve assembly. Upon inhalation, the flapper valve re-seats and prevents air flow into the breathing mask through the exhalation valve chamber. By reducing the exhalation resistance pressures, the user is able to use the breathing apparatus comfortably for extended periods of time without experiencing fatigue from added exertion caused by increased flow resistance.

DESCRIPTION OF THE PREFERRED EMBODIMENT

Figure 1:
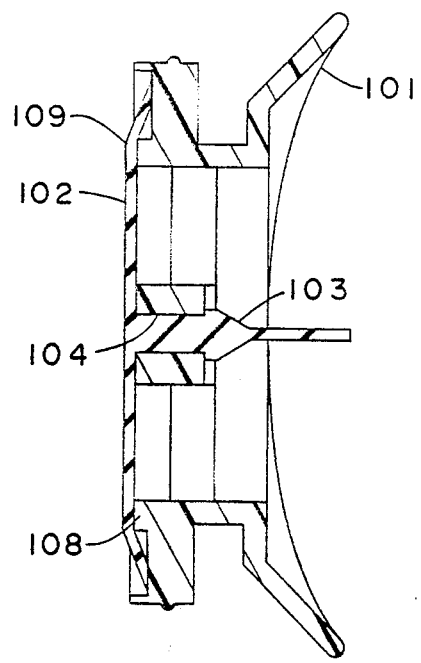
FIG. 1 is a cross sectional view of the valve body and flapper valve of the unidirectional exhalation valve.

Referring to FIG. 1, an umbrella-shaped circular flapper valve 102 is shown positioned in a cylindrical valve body 101. The flapper valve 102 is circular in design and umbrella-shaped, but may also be of any shape that sufficiently seals the air passage opening of the valve body 101 when air is inhaled into the mask. The flapper valve 102 may be of rubber or any other suitable flexible material to permit sealing of the air channel. The flapper valve 102 is connected to the valve body 101 by inserting the nipple end of the flapper valve 103 through a hole 104 in the valve body 101 and connecting the nipple 103 to the valve body 101 by any suitable means. Air channels (not shown) are formed in the valve body 101 to permit the flow of air through the valve body 101. The edges of the flapper valve 109 are bent inward towards the valve body 101 to provide a better seal on the valve seat, that is formed around the valve body 101, during inhalation.

Figure 2:
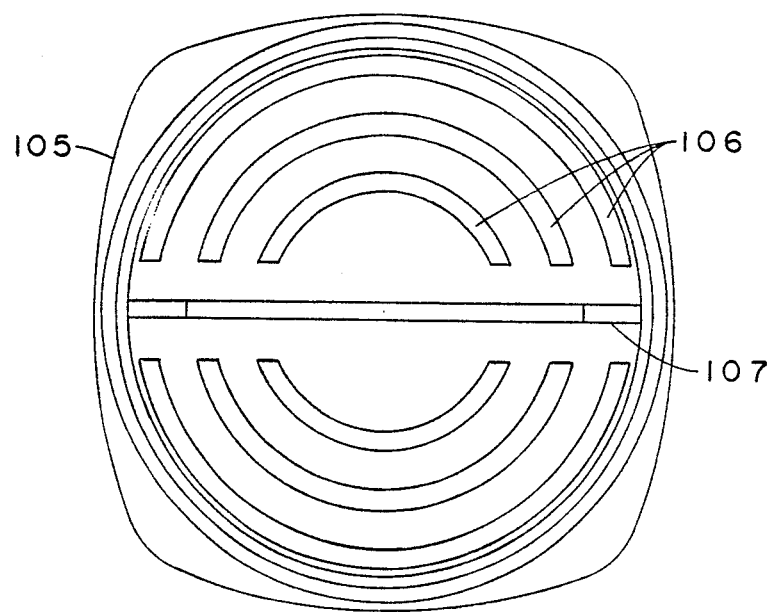
FIG. 2 is a plan view of inside of the valve cap, showing a flapper valve blade divider, for the unidirectional exhalation valve.
Figure 3:
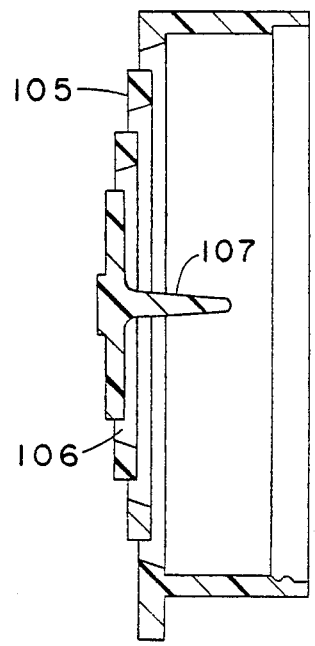
FIG. 3 is a cross sectional view of the valve cap, having a flapper valve blade divider, for the unidirectional exhalation valve.

Referring now to FIG. 2, a plan view of the inside of a cup-shaped valve cap 105 is shown having air channel slots 106 formed in the cap. The semi-circular air slots 106 permit the passage of exhaled air through the cap 105. Across the diameter of the cap 105 a rectangular-shaped blade divider 107 is formed between the interior walls of the cap 105. By referring to FIG. 3, the arrangement of the blade 107 is shown as it is positioned perpendicular to the valve cap face.

Figure 4:
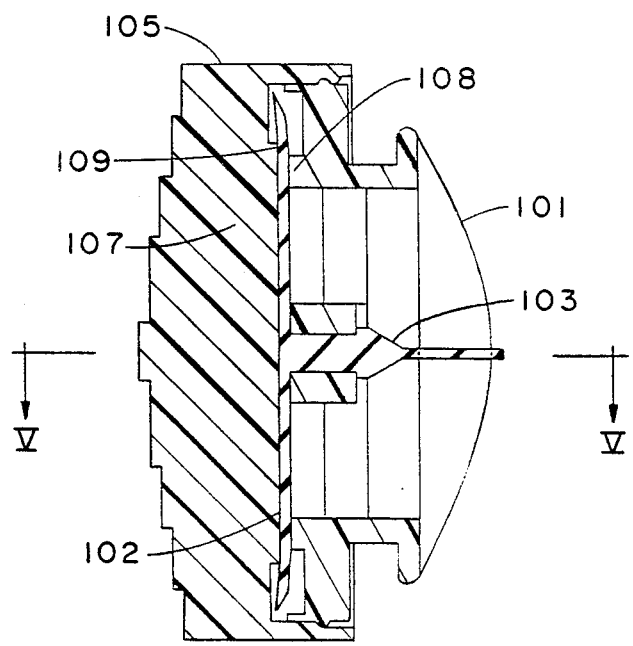
FIG. 4 is a cross sectional view of the general arrangement assembly of the unidirectional exhalation valve showing the valve cap assembled to the flapper valve.

Referring now to FIG. 4, the assembled unidirectional exhalation valve is shown. The valve cap 105 can be connected to the valve body 101 by any suitable means, such as adhesion or a tongue and groove that are formed in the valve cap 105 and the valve body 101 to snap into place when the parts are connected.

Figure 5:
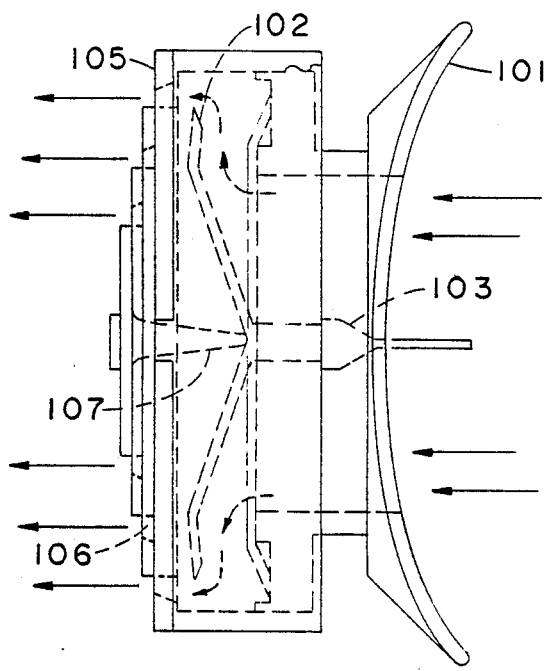
FIG. 5 is a general arrangement view of the unidirectional exhalation valve showing both the original position of the flapper valve in contact with the blade and the flapper valve position during exhalation taken on line V—V of FIG. 4.

When the valve cap 105 is connected to the valve body 101, the blade 107 impinges upon the flapper valve 102 across the diameter of the flapper valve 102. The blade 107 compresses the flapper valve 102 causing the bent edge 109 of the circular flapper valve 102 to flatten out where the edges 109 meet the valve seat 108. The flattened edges 109 are 180° apart along the outer circumference of the flapper valve. By flattening out the two edges 109, the moment of inertia of the flapper valve 107 is reduced along the axis of the valve 102 that is in contact with the blade 107. The reduced moment of inertia of the flapper valve 102, along the edge of the blade 107, causes the flapper valve 102 to bend easily along the blade edge 107 providing low resistance to the exhaled air flow. Referring now to FIG. 5, upon exhalation, the user blows air through the valve body 101 around the flapper valve 102 and out of the valve cap 105 through the channel slots of the cap, substantially as shown by the air flow directional arrows. During exhalation, the user's exhaled air causes the flapper valve 102 to deform by bending up around the sides of the blade 107 along the length of the blade 107.

Without the blade 107 causing the edges 109 of the flapper valve to deflect, air is forced around the entire circumference of the flapper valve 102. Since the flapper valve 102, without the blade 107, would not bend along a straight line, the resistance to the exhaled air passing through the valve body 101 is increased. Extended use of a breathing mask having high exhalation resistance pressures, can cause fatigue in the user due to the extra effort needed by the user's lungs to blow air out of the exhalation valve.

After the user exhales, the flapper valve 102 returns to a seated position against the valve seats 108 again sealing the air flow channel through the valve body 101 to prevent atmospheric air passage into the mask during inhalation and back leakage from the outside atmosphere.

The principle of the invention has been illustrated and described in what is now considered to be its best embodiment. It is to be understood, however, that within the scope of the appended claims, the invention may be practiced otherwise than as specifically illustrated and described herein.

What is claimed is:

1. A one-direction breathing valve comprising:
   a. a hollow cylindrical housing having a peripheral valve seat at a first end thereof and a means adapted to connect to a breathing mask at a second end thereof;
   b. a resilient disk flapper valve axially secured in the housing positioned to engage said valve seat during inhalation and when in a neutral position and having a central substantially flat portion and preformed peripheral inclined flange around the edge of said flapper valve that extends beyond and below said valve seat to both prevent air flow into a breathing mask through said housing and permit air flow out of a breathing mask through said housing;
   c. a cup-shaped valve cap secured to said housing covering said first end and having an opening in said cap to permit air flow therethrough; and,
   d. a means formed in said cap to fixedly compress two diametrical opposite points of the inclined flange around the valve periphery against said valve seat to reduce the bending moment of inertia of said flapper valve.

2. A one-direction breathing valve according to claim 1 wherein said flapper valve compression means is a rectangular blade-shaped divider extending across the diameter of the interior of said cup-shaped valve cap and positioned perpendicular to the bottom of said cup-shaped valve cap.

* * * * *